US011947747B2

(12) United States Patent
Shaw et al.

(10) Patent No.: US 11,947,747 B2
(45) Date of Patent: Apr. 2, 2024

(54) ALIGNING INPUT INTERFACE OF TOUCHSCREEN WITH OVERLAY FOR TOUCHSCREEN

(71) Applicant: Miura Systems Limited, High Wycombe (GB)

(72) Inventors: Darren Shaw, High Wycombe (GB); Gareth Richards, High Wycombe (GB); Enrique Garrido, High Wycombe (GB)

(73) Assignee: Miura Systems Limited, High Wycombe (GB)

( * ) Notice: Subject to any disclaimer, the term of this patent is extended or adjusted under 35 U.S.C. 154(b) by 0 days.

(21) Appl. No.: 17/800,377

(22) PCT Filed: Feb. 18, 2021

(86) PCT No.: PCT/GB2021/050400
§ 371 (c)(1),
(2) Date: Aug. 17, 2022

(87) PCT Pub. No.: WO2021/165683
PCT Pub. Date: Aug. 26, 2021

(65) Prior Publication Data
US 2023/0105790 A1    Apr. 6, 2023

(30) Foreign Application Priority Data
Feb. 18, 2020 (GB) .................................... 2002214

(51) Int. Cl.
*G06F 3/039*    (2013.01)
*G06F 3/04886*    (2022.01)
*G06F 3/16*    (2006.01)

(52) U.S. Cl.
CPC ........ *G06F 3/0393* (2019.05); *G06F 3/04886* (2013.01); *G06F 3/167* (2013.01); *G06F 2203/04809* (2013.01)

(58) Field of Classification Search
CPC .... G06F 3/0393; G06F 3/04886; G06F 3/167; G06F 2203/04809; G06F 3/0418; G09B 21/007
See application file for complete search history.

(56) References Cited

U.S. PATENT DOCUMENTS 6,776,546 B2 * 8/2004 Kraus ................. G06F 3/04886
400/489
8,421,761 B2 * 4/2013 Natanzon ............ G06F 3/04842
345/173
(Continued)

FOREIGN PATENT DOCUMENTS

EP    2966539 A1    1/2016

OTHER PUBLICATIONS

May 11, 2021—(WO) International Search Report and Written Opinion—PCT/GB2021/050400.
(Continued)

*Primary Examiner* — Rodney Amadiz
(74) *Attorney, Agent, or Firm* — Banner & Witcoff, Ltd.

(57) ABSTRACT

A method for aligning an input interface of a touchscreen with an overlay for the touchscreen is provided. The method comprises receiving a touch input on the touchscreen, wherein the touch input identifies a first position on the touchscreen corresponding to an alignment mark of the overlay; determining, based on the received touch input, a region of the touchscreen in which to render the input interface; and rendering the input interface in the determined region of the touchscreen.

27 Claims, 5 Drawing Sheets

(56) References Cited

U.S. PATENT DOCUMENTS

| | | | |
|---|---|---|---|
| 9,671,954 B1 | 6/2017 | Jaugilas et al. | |
| 9,965,116 B1 | 5/2018 | Wolter | |
| 10,401,962 B2 * | 9/2019 | Rihn | G06F 3/016 |
| 10,739,991 B2 * | 8/2020 | Koszek | G06F 40/109 |
| 10,884,565 B2 * | 1/2021 | Pavageau | G06F 3/03547 |
| 10,921,967 B2 * | 2/2021 | Jeong | G06F 3/04845 |
| 2003/0098803 A1 | 5/2003 | Gourgey et al. | |
| 2011/0109594 A1 | 5/2011 | Marcus | |
| 2011/0157037 A1 | 6/2011 | Shamir et al. | |
| 2011/0298721 A1 | 12/2011 | Eldridge | |
| 2018/0095588 A1 | 4/2018 | Klein et al. | |
| 2019/0042040 A1 | 2/2019 | Kumar et al. | |
| 2020/0296317 A1 * | 9/2020 | Post, Jr. | H04N 7/0122 |

OTHER PUBLICATIONS

Aug. 3, 2020—(GB) Search Report—GB2002214.1.
Aug. 16, 2022—(GB) Examination Report—GB App 20002214.1.

* cited by examiner

ALIGNING INPUT INTERFACE OF TOUCHSCREEN WITH OVERLAY FOR TOUCHSCREEN

CROSS-REFERENCE TO RELATED APPLICATIONS

This application is a U.S. National Stage application under 35 U.S.C. § 371 of International Application PCT/GB2021/050400, filed Feb. 18, 2021, which claims the benefit of priority to United Kingdom Patent Application GB 2002214.1 filed Feb. 18, 2020. Benefit of the filing date of each of these prior applications is hereby claimed. Each of these prior applications is hereby incorporated by reference in its entirety.

FIELD

The present disclosure relates generally to methods for aligning input interfaces on touchscreens with touchscreen overlays.

BACKGROUND

Increasingly, electronic products are built with a touchscreen as the only user interface. This presents challenges for people who are blind, have poor sight or have other disabilities that make precision of touch difficult.

Many jurisdictions have enacted legislation that places a legal obligation to provide equivalence of service to people regardless of any disabilities. Notably, the Americans with Disabilities Act of 1990 (ADA) and the United Kingdom Disability Discrimination Act (DDA) impose such obligations. The European Union (EU) has proposed to import similar provisions of the US ADA into EU Law in the future.

There is already a significant base of installed kiosks and other devices have touchscreens and that would therefore not comply with such legislation. Such kiosks typically allow a user to enter a personal identification number (PIN) to verify a transaction. In addition, new payment innovations such as PIN on consumer off-the-shelf (COTS) devices, in which where a mobile phone or tablet owned by the merchant would be used to enter the customer PIN, would also not be compliant with legal obligations.

It is known to provide overlays having tactile features on touchscreens. However, there are several drawbacks to prior art methods and systems. For instance, such systems typically require precise manual installation and if an overlay is not installed in correct alignment, then it is necessary to reinstall the overlay potentially multiple times. This can be arduous and can still result in inaccurate installation.

It is therefore an object of this disclosure to address these and other problems with prior art systems.

SUMMARY

Against this background and in accordance with a first aspect, a method for aligning an input interface of a touchscreen with an overlay for the touchscreen is provided, according to claim 1. A computer program and a computer-readable medium are also provided according to claims 20 and 21, respectively. In a further aspect, a system according to claim 22 is provided. A device having touchscreen is also provided, according to claim 28.

The present disclosure relates generally to a method and system for retro-fitting overlays to touchscreen devices to improve accessibility, particularly for visually impaired users, in a variety of different environments, using an overlay, which may be standard sized or customised for the touchscreen, that does not interfere with the normal operations of such devices. The overlay is used with a software component that presents a data entry keypad (which may be standard sized) aligned with a mark or several marks (e.g. a tactile identifier or identifiers) on the overlay. This keypad can then be used for financial or other data entry including, for instance, PIN number, authentication codes, transaction values and the like. A calibration procedure is provided in which a user presses on a specific position (or positions) on the installed overlay to allow the touchscreen device to identify where the overlay is on the screen. This then allows an interface to be rendered on the screen that is at the correct location, based on the touch input received in the calibration procedure. The calibration method means that the methods of the disclosure can work irrespective of the size on the overlay or the screen to which the overlay is attached, and even when the overlay is attached to a screen at an incorrect angle.

The overlay may be sized in order to be able to fit the majority of consumer smart devices including mobile phones, tablets and other devices, and therefore presents a familiar interface for blind or partially sighted users. In addition, the self-calibration scheme makes it straightforward for the user, merchant or OEM to retro-fit to their equipment, with limited impact, using a software component that performs a method that automatically detects the overlay and sizes the data entry keypad accordingly. This self-calibration software also detects the orientation of the overlay, such that various styles of keypad (for example, with different keypad layouts) can be presented. Any user who has the overlay of the present disclosure can, for instance, use it on their personal device (or potentially on a third party device). Advantageously, in this case the user is then familiar with the dimensions of the overlay, which can improve the usability of the overlay (and also the device when the overlay is used).

In generalised terms, there is provided a method for aligning an input interface of a touchscreen with an overlay for the touchscreen. The method comprises: receiving a touch input on the touchscreen, wherein the touch input identifies a first position on the touchscreen corresponding to an alignment mark of the overlay; determining, based on the received touch input, a region of the touchscreen in which to render the input interface; and rendering the input interface in the determined region of the touchscreen. In this way, the input interface can be rendered in the correct place on the touchscreen, even if the overlay was not positioned accurately, regardless of the size of the touchscreen. In this method, knowledge of the dimensions of the overlay may be used to perform the calibration process. As a device may have a touchscreen that is larger than the overlay, the region in which the input interface is rendered may be changed (e.g. if the overlay is remove and re-applied) and/or the input interface may be smaller than the touchscreen.

Preferably, the method comprises rendering an input element of the input interface at the first position, such that the rendered input element is aligned with the alignment mark of the overlay. In this way, the alignment mark may be used as an identifier of a specific input element on the input interface. For instance, the alignment mark may correspond with the central '5' key of a 3×3 numerical keypad, so that the alignment mark can be used in the alignment process and can also be used to guide a user to the '5' key.

Preferably, the input interface comprises a plurality of further input elements, and rendering the input interface comprises rendering one or more of the plurality of further input elements in alignment with one or more corresponding input marks of the overlay. This may allow a user to identify (without using their sight) multiple different input elements using the marks of the overlay.

Preferably, rendering the input interface comprises rendering each of the plurality of further input elements in alignment with a corresponding input mark of the overlay. Each input element may therefore be associated with a specific mark, so that any input element can be found using a corresponding input marks (for example using touch only).

Throughout this disclosure, the terms "alignment mark" and "input mark" are used to distinguish between the usage of the marks on the overlay in the disclosed methods. In the context of the disclosure, an alignment mark is any mark on the overlay that the disclosed methods use to align an input interface with the overlay. An input mark is a mark on the overlay that can be used by a user when using the input interface to use the touchscreen (e.g. by serving as a tactile indicator for an input element of an input interface) but which is not used in the process of aligning the input interface. It is to be noted that the usage of the terms "input mark" and "alignment mark" does not imply any structural difference between the two types of marks.

It will be appreciated that an alignment mark could be used for a user to identify (e.g. by feeling a mark on the overlay) the location of an input element (e.g. a key) of an input interface (e.g. a keypad). For instance, the central input element of a 3×3 keypad is the '5' key, and a mark on an overlay corresponding to the '5' key may be used to align the input interface with the overlay (for example by a user pressing the '5' key mark), meaning that it serves as an "alignment mark". Thereafter, once the input interface has been rendered in alignment with the overlay (e.g. when an input interface having a '5' key has been presented with the '5' key located at or in a defined spacing from the position identified by pressing the mark), a user may identify the '5' key by feeling the alignment mark. In this context, the mark associate with the '5' key would be considered an alignment mark rather than an input mark, due to its usage in the alignment process. However, the overlay may also comprise any number of additional marks that are not used in the alignment process, and which are therefore defined as input marks. The input marks may be structurally and/or visually identical to, similar to, or different to the alignment mark.

The method may comprise receiving a second touch input on the touchscreen that identifies a second position on the touchscreen corresponding to a second alignment mark of the overlay. The method may also comprise receiving a third touch input on the touchscreen that identifies a third position on the touchscreen corresponding to a third alignment mark on the overlay. More accurate alignment of the overlay with the input interface can be achieved using a greater number of alignment marks. This may improve the size, position, orientation, layout and/or aspect ratio of an input interface are correctly rendered on the touchscreen.

For instance, the method may comprise determining, based on the received touch inputs, a size for the input interface, and rendering the input interface with the determined size.

Similarly, the method may comprise determining, based on the received touch inputs, an orientation for the input interface, and rendering the input interface with the determined orientation. Determining the orientation for the input interface may be based on: the positions of the received touch inputs; and/or the order in which the touch inputs are received.

In some embodiments, the input interface may have edges having different lengths and in this case the method may comprises: determining an aspect ratio for the input interface based on the received touch inputs; and rendering the input interface with the determined aspect ratio.

In each of these cases, the use of multiple touch inputs advantageously increases the accuracy with which the size, position, orientation, layout and/or aspect ratio of an input interface are rendered on the touchscreen. This therefore provides a more user-friendly overlay and touchscreen than existing systems.

The method may further comprise: rendering the input interface in a first scheme when a short edge of the input interface is oriented horizontally on the touchscreen; and rendering the input interface in a second scheme when a short edge of the input interface is oriented vertically on the touchscreen. In this case, the input elements of the input interface are arranged differently in the first and second schemes. This may allow an input interface to be rendered in a way that is more ergonomically friendly, due to the layout of the interface and the dimensions and shape of the touchscreen device.

For example, the input interface may comprise: in the first scheme, one or more function keys arranged below a keypad and/or keyboard; and/or in the second scheme, one or more function keys arranged to the side of a keypad and/or keyboard. These layouts are particularly user-friendly and represent layouts with which users will be familiar.

When using first and second positions to determine the region in which to render the input interface, the first and second positions may correspond to corners of the input interface. Alternatively, the second and third positions may correspond to corners of the input interface. Various positions on the overlay can be used to determine the correct alignment therefor. The use of the corners is advantageous because the corners are separated by a relatively large distance, which means any user error during calibration (e.g. caused by pressing the point of the overlay by a small error) is relatively small and insignificant when compared with the separation of the points used for calibration.

Various input interfaces may be used comprising, for example, an arrangement of one or more input elements selected from: a keypad; a payment terminal interface; a keyboard; numeric characters; alphanumeric characters; symbolic characters; one or more function keys; a PIN entry device; an automated teller machine PIN pad; and/or a chip authentication program interface.

In some embodiments, the method may further comprise: receiving an input indicative of an audio request; and in response to receiving the input indicative of an audio request, providing an audio prompt to a user of the touchscreen. This may further assist a visually impaired user. For example, the audio prompt may comprise audio instructions for using the: touchscreen; input interface; and/or overlay. This may guide the user through the process of using the overlay and/or touchscreen.

The input indicative of a request for audio output may comprise one or more of: a long press on the touch screen; a plurality of presses on the touch screen within a predefined time period; and/or an audio input. Each of these may be performed easily by visually impaired users. A double-tap or triple-tap on the touchscreen could be used.

The present disclosure provides in a further aspect a method comprising: placing an overlay comprising one or more alignment marks on the touchscreen of a device having touchscreen; and causing the device to perform any of the previously described methods. This advantageously allows an overlay to be retro-fitted to any suitable touchscreen to provide the previously-described advantages. Any touchscreen that is larger than the overlay can be used.

Also provided is a computer program comprising instructions to cause a device having a touchscreen to execute any of the previously-described methods. A computer-readable medium having stored thereon the computer program is also provided.

In further aspects, a system is provided, the system comprising: the computer program or the computer-readable medium; and an overlay for a touchscreen, the overlay comprising one or more alignment marks for aligning the overlay with an input interface when the computer program is executed. This system allows the accessibility of almost any touchscreen device to be enhanced by allowing visually impaired users to interact with the touchscreen through a user-friendly overlay that is easy to install accurately. In such a system, the computer program will have knowledge of the dimensions of the overlay to allow the calibration process to be performed.

The overlay may comprise one or more input marks each corresponding to an input element of the input interface. These input marks may assist a user in locating a specific input element even if they cannot see the desired element. Thus, preferably, the input marks and/or the alignment marks are tactile elements. Nevertheless, the input marks may be non-tactile elements and/or the alignment marks may be non-tactile elements. For example, the alignment marks and/or input marks could be opaque and/or coloured, to allow a user to see them when the overlay is on the touchscreen.

One or more of the tactile elements may be: a protrusion; a depression; or an opening. Various combinations of tactile elements may be used to improve usability. For example, tactile elements that are intended to be positioned over function keys may use differently-styled tactile elements to tactile elements that are intended to be positioned over alphanumeric keys, so as to more easily distinguish the function keys from the alphanumeric keys.

Throughout the present disclosure, the overlay is preferably transparent. This allows users who are not visually impaired to interact with the touchscreen in addition to allowing visually impaired users to use the touchscreen.

The overlay may be the same size as the touchscreen or the overlay may be smaller than the touchscreen. The system is flexible and capable of being used with various devices. Moreover, the overlay may be square; rectangular; circular; triangular; or polygonal. Any shape can be used. If a circular (radially symmetric) overlay is used, then pressing an alignment mark at the centre of the circle would uniquely identify the correct position on the touchscreen for the region in which to render the input interface.

A device having touchscreen and arranged to execute the previously-described computer program is also provided. The device may be: a point-of-sale device; a mobile phone; a touchscreen monitor; a tablet; a gaming device; an automated teller machine; an electronic voting machine; or a self-service kiosk.

As noted previously, the overlays of the present disclosure can be used with third party devices. Therefore, it will also be understood that the overlays of the present disclosure can be provided separately, as standalone components. For example, a user may carry their own overlay around with them (e.g. for hygiene reasons). In this case, the embodiments described herein are highly advantageous because they allow one overlay to be used with multiple devices. This can allow the user to be confident that their overlay is hygienic because they are the only user of their overlay. The disclosure provides quick, accurate and easy methods for aligning the input interface with the overlay which is particularly advantageous in this usage scenario. The overlays described herein may therefore have reusable or releasable attachment mechanisms to allow the overlay to be attached and re-attached to a touchscreen. For example, any means for attaching and re-attaching may be used, such as an adhesive coating on at least one surface (e.g. to provide a smooth, sticky surface), a clip, an attachment arrangement on the overlay for connecting to a complementary attachment on the touchscreen (e.g. hook or loop fasteners at an edge of the overlay configured to attach with respective loop or hook fasteners on the touchscreen). It will be understood that such overlays can have any of the features described herein.

LISTING OF FIGURES

Embodiments will now be described, by way of example only, with reference to the accompanying drawings in which.

DETAILED DESCRIPTION

Figure 1:
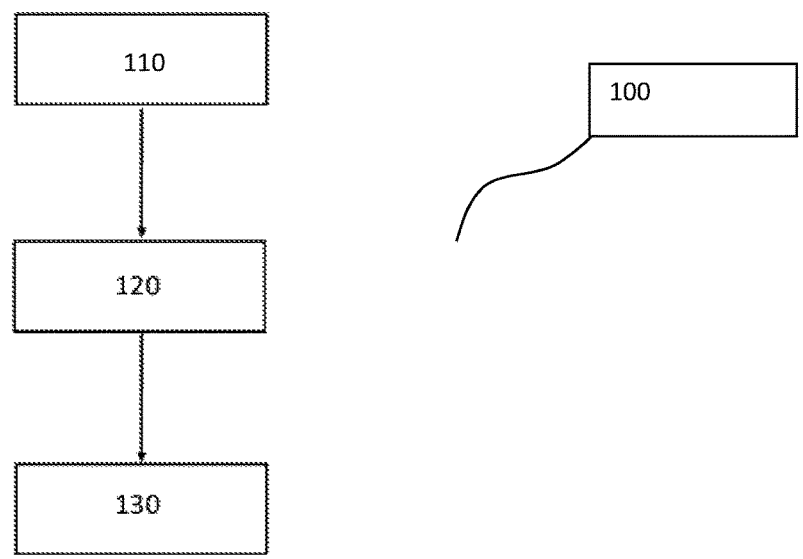
FIG. 1 shows a method for aligning an input interface with an overlay for a touchscreen.

FIG. 1 shows a schematic diagram of a generalised method 100 for aligning an input interface of a touchscreen with an overlay for the touchscreen. The method 100 comprises a first step 110 of receiving a touch input on the touchscreen. The touch input identifies a first position on the touchscreen corresponding to an alignment mark of the overlay. The method 100 further comprises a step 120 of determining, based on the received touch input, a region of the touchscreen in which to render the input interface. Then, the method 100 comprises a step of 130 rendering the input interface in the determined region of the touchscreen. The method 100 thereby ensures that the input interface is rendered at an appropriate position on the touchscreen, in view of the received touch input.

Figure 2:
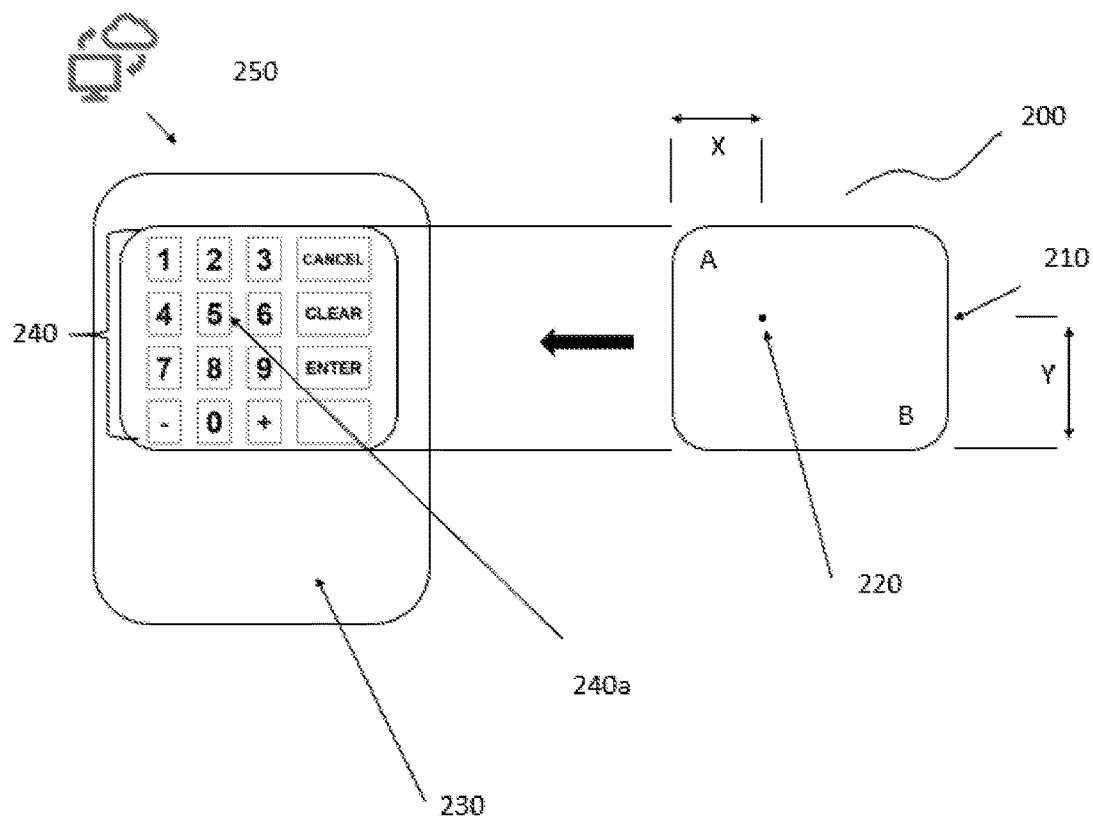
FIG. 2 shows schematically a system comprising a touchscreen and an overlay.

FIG. 2 shows a system 200 comprising a transparent overlay 210 that comprises an alignment mark in the form of a raised dot 220. The system 200 of FIG. 2 can be used to implement the method 100 of FIG. 1. The raised dot 220 is located at co-ordinates (X, Y) in the overlay 210, where X is the distance from the leftmost edge of the overlay 210 and Y is the distance from the bottom edge of the overlay 210. The overlay 210 is intended to be placed over the touchscreen 230, such that when the overlay 210 is affixed to the touchscreen 230, the raised dot 220 is at the position (X, Y) relative to the lower left corner of the touchscreen 210. The overlay 210 is at least partially transparent such that, when placed on the touchscreen 230, the touchscreen 230 can be viewed through the overlay 210. A software component 250 is loaded onto the device with the touchscreen 230 for rendering an input interface 240 in a calibrated arrangement. The software component 250 may be installed within the device as shown, or it may be partially located within the device with certain parts of the software component being installed remotely from the device (e.g. utilising cloud-based processing). Aspects of this disclosure are directed to ensuring that a keypad image position 240a is rendered in alignment with the raised dot 220 when the overlay 210 is applied to the touchscreen.

To calibrate, the overlay 210 is placed onto the touchscreen and an alignment mark, which in this case is a raised dot 220, is pressed. This locates the '5' key on the keypad (although any other key on the keypad could be used), which is located at the keypad image position 240a. Thus, the raised dot 220 is used to align the input interface 240. Areas A and B are then pressed to tell the software component 250 what the aspect ratio of the overlay 210 is and what its X/Y dimensions are, because in some embodiments, the input interface 240 and overlay 210 may have edges having different lengths and so the methods may comprises determining an aspect ratio and rendering the input interface 240 with the determined aspect ratio. In this context, areas A and B also serve as alignment marks of the overlay 210.

Once a user has pressed one or more of the raised dot 220, area A, and area B, then step 120 of the method of FIG. 1 is executed. This step receives data indicative of positions on the touchscreen identified by pressing the alignment marks, which are the dot 220 and/or area A and/or area B. Step 120 leads to a region of the touchscreen 230 for displaying an input interface 240 being determined. By using the received touch inputs, an input interface 240 may be rendered on the touchscreen 230 in the determined region that ensures the overlay 210 is immediately useable with the input interface 240.

This disclosure encompasses scenarios in which differently sized overlays 210 are available for different devices. In such cases, pressing two areas during calibration would allow appropriate dimensions for the input interface 230 to be determined, as pressing two points on the touchscreen 230 provides data indicative of the size of the overlay 210. Thus, these dimensions can be used to ensure that the size, position, orientation, layout and/or aspect ratio of an input interface 240 are correctly rendered on the touchscreen 210. The size, position, orientation, layout and/or aspect ratio of the input interface 240 can be determined using two touch inputs (e.g. by pressing the raised dot 220 and one of the areas A and B). Alternatively, a more accurately rendered input interface 240 can be obtained using three touch inputs (e.g. by pressing the raised dot 220 and both of the areas A and B). Alternatively, a single touch input can be used for a quicker but less accurate rendering process (e.g. by pressing only one of the raised dot 220, area A and area B) if the size of the overlay 210 are known and the input interface 240 is symmetric so that the angle of the overlay 210 with respect to the touchscreen 230 does not affect its usage. In some scenarios, the calibration process may use only the corners of the overlay 210 (i.e. they may press areas A and B only) to determine the region in which to render the input interface 240, without requiring the user to press the raised dot 220. The number of touch inputs used in the rendering process can be varied depending on the needs of the user and the specific overlay 210.

When a plurality of touch inputs is used for rendering the input interface 240, the order in which the touch inputs are received may be used to assist the rendering. For example, if two inputs are received, then there may be two alternative orientations for the region for the input interface 240 and each orientation would be aligned with each of the received touch inputs (e.g. by rotating the interface by 180 degrees). In this case, the order of receiving the inputs can be helpful. For instance, if area A is pressed before area B, then the top left area of the input interface 240 can be rendered near area A and the bottom right area of the input interface 240 can be rendered near area B. If the corners were rendered at the opposite areas, then this may lead to portions of the overlay being positioned over incorrect areas of the input interface 240.

Areas A and B on the overlay 210 may comprise tactile elements for a user to touch during the alignment procedure. Alternatively, they may be identifiable to a user by being, for example, partially coloured and/or partially opaque, and/or by having text at positions A and B on the overlay 210. The software component 250 may be configured to cause the device having the touchscreen 230 to provide a prompt to a user to press one or more of the raised dot 220 and/or area A and/or area B. The prompt may be a visible and/or an audible prompt. The pressing of areas 220, A and B when the overlay 210 is on the touchscreen 230 provides touch inputs indicative of a position on the touchscreen 230 and these touch inputs can be used in the method 100 of FIG. 1. In such cases, when areas A and B are used in this way, they serve as alignment marks of the overlay 210.

In FIG. 2, the rendered input interface 240 is a 3×3 numerical keypad having the numbers 1-9, with function keys (cancel, clear, enter) to the right hand side, and with "−", 0 and "+" keys arranged below the bottom row of the keypad. Such an input interface 240 may be used instead of an automated teller machine (ATM) terminal for inputting a PIN number during a transaction, for example.

This system and method are applicable to various types of input interface 240 and alleviate the difficulty of accurately placing an overlay 210 on a touchscreen 230. For example, touchscreen overlays may be thin and flexible with adhesive on one side, which makes them difficult to accurately affix to touchscreens, especially when the overlay folds and potentially adheres to itself.

Audio may also be included in these processes. For example, if a user presses the raised dot 220, then the software component 250 may cause the device to speak to say, for example, the type of input interface 240 (e.g. a PIN pad) that is on the touchscreen 230 to assist the user (who may be visually impaired). The audio prompt may comprise any audio instructions for using the touchscreen 230, input interface 240 and/or the overlay 210.

The rendered input interface 240 may be any input entry mechanism such as, for example, an input interface 240 that replicates a PIN Entry Device (PED) or an ATM PIN pad. These embodiments may be used by card issuers for mobile banking and/or remote telephone authentication. For instance, this may be the DDA equivalent of a physical Chip Authentication Program (CAP) reader. The overlay may be an overlay for DDA supplied by issuing banks to allow cardholders to use a smartphone to enter authentication codes or a PIN for mobile banking applications or other secure applications. It will be appreciated that this disclosure is generally applicable to various area of technology, including financial security and general security of touchscreen devices where the entry of authentication codes may be required. In a further example, an employer may require a user to access an authentication code in to a touchscreen device in order to access a virtual private network (VPN), and this may be difficult for a visually impaired user, in which case embodiments of this disclosure may be used to assist with the authentication of a device seeking access to a VPN.

The above procedure describes a calibration procedure in which an overlay 210 is affixed to the touchscreen 230 and the input interface 240 calibrated such that the input interface 240 is rendered in alignment with the overlay 210. In other words, the above-described processes may be used to perform an initial calibration of a device and overlay 210. Following this calibration, the input interface 240 may then be minimised to allow the touchscreen 230 to be used for other functionality. Then, if it is necessary to enter data (e.g. during a payment transaction), then the user (e.g. a cardholder) can find the raised dot 220 by touch and pressing it will automatically ensure that the '5' key 240a on the data entry screen 240, and hence the data entry screen 240 itself, is it in the correct position with the '5' key under the dot 220 and the data entry screen 240 generally aligned with the overlay 210, irrespective of any misalignment of the overlay 210 with the touchscreen 230. The other input elements of the input interface 240 (the keys) will be rendered in their correct respective positions, which are standard for payment systems, and which is the current case for conventional keypads.

Pressing the dot 220 for a period of time (e.g. a long press) may automatically invoke audio prompts that can guide the customer through the usage scenario (e.g. a transaction), which could be played through a headset or a speaker of the device, for example. Other touch inputs (e.g. a double press of the dot, or a plurality of presses on the touch screen within a predefined time period) may be used to invoke such audio prompts.

Figure 3:
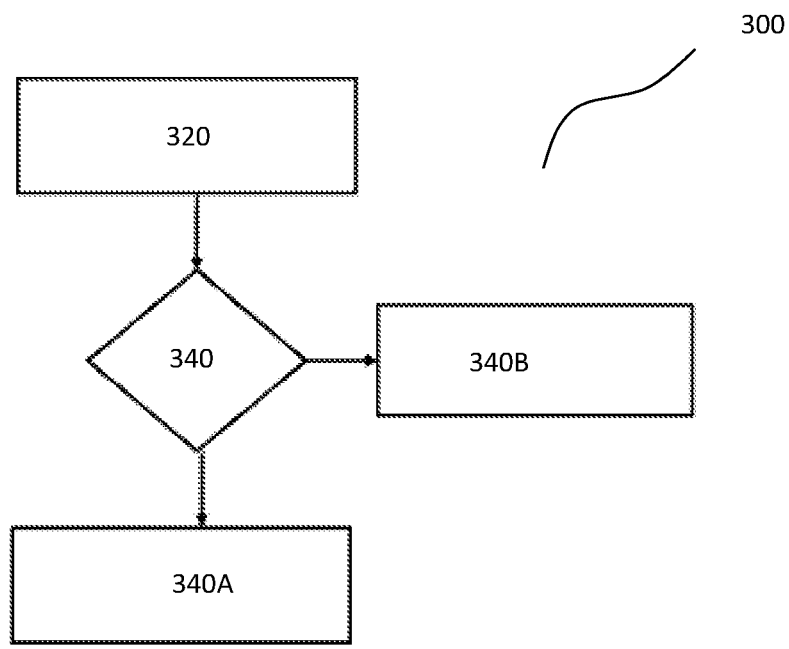
FIG. 3 shows a method of selecting a scheme for an input interface.
Figure 6A:
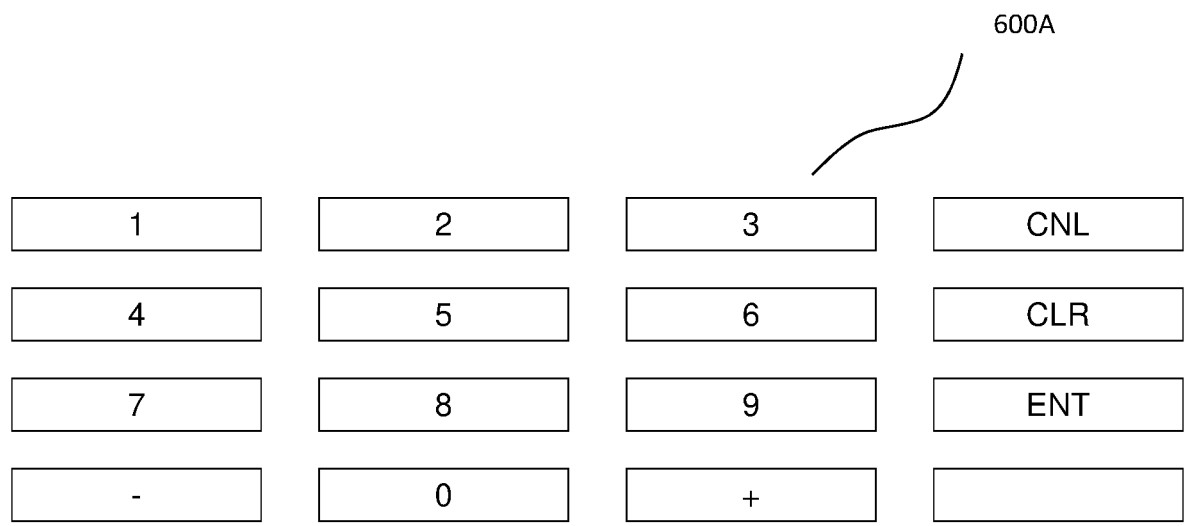
FIGS. 6A and 6B show different schemes for an input interface.
Figure 6B:
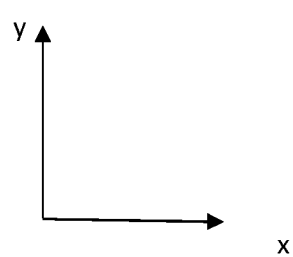
Figure 6B:
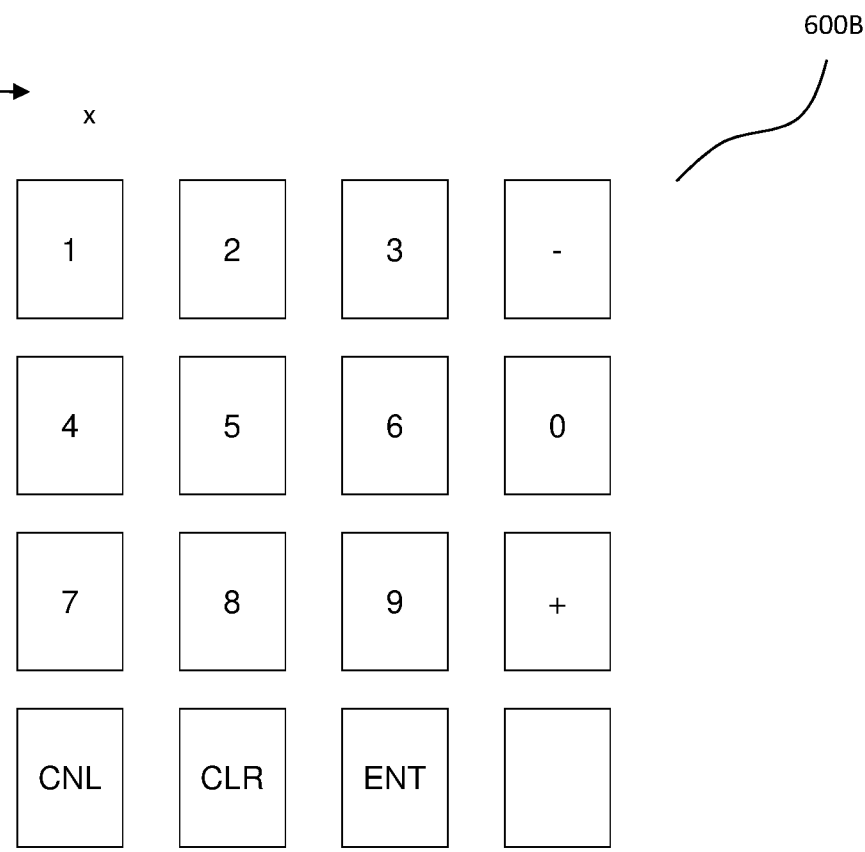

FIG. 3 shows a method 300 for selecting an input scheme based on received touch inputs. The method of FIG. 3 comprises a step 320 of receiving a plurality of (i.e. two or more) touch inputs and determining 340 an aspect ratio based on the received touch inputs. Based on the aspect ratio, a first input scheme is selected at step 340A or a second input scheme is selected at step 340B. If the short X dimension is horizontal, then the first scheme is selected as shown in FIG. 2. If the short dimension X dimension is vertical, then a second scheme (in which CNL, CLR, ENT are arranged below the numbers) is selected. FIGS. 6A and 6B show more detailed examples of such input schemes. Other layouts may be used without departing from the scope of the disclosure.

Figure 4:
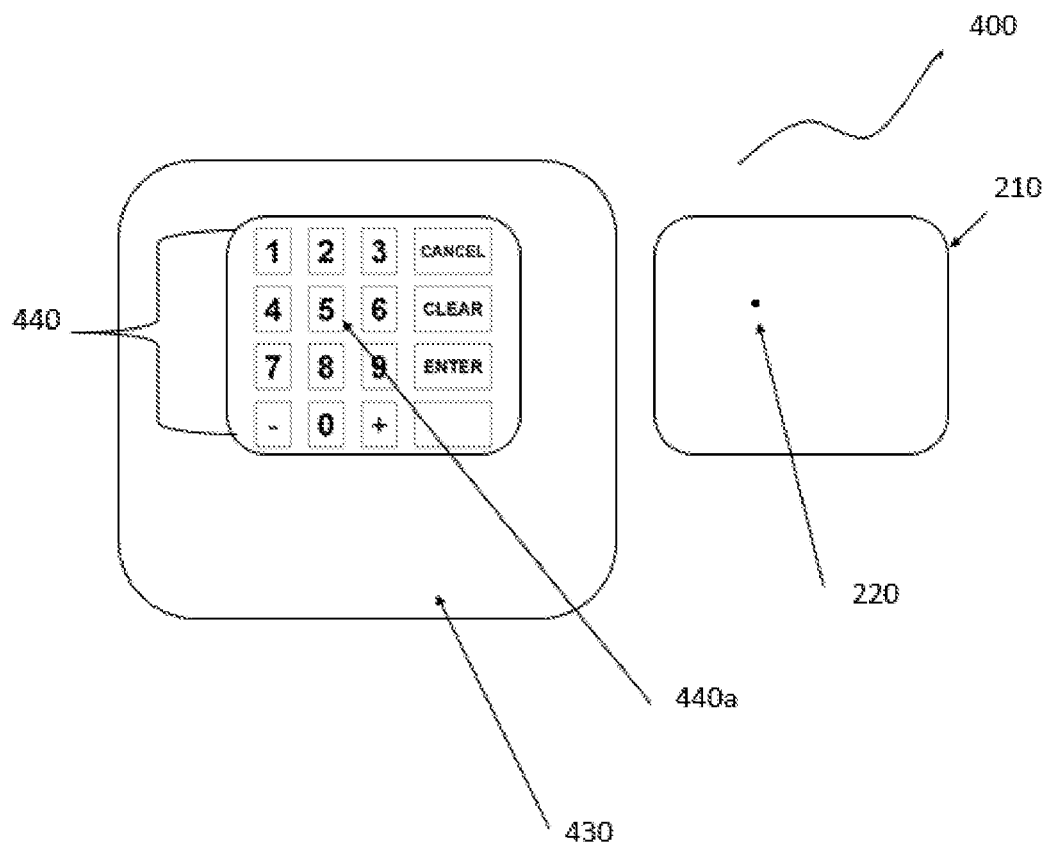
FIG. 4 shows schematically a further system comprising a touchscreen and an overlay.

Turning next to FIG. 4, a system 400 that is similar to the system 200 of FIG. 2 is shown. The same transparent overlay 210 is depicted fitted to a larger touchscreen 430. An identical software component 250 (not shown in FIG. 4) may be used to recognise when the user presses the location of the raised dot 220, and bring up the input interface 440 (shown as a data entry keypad) in exactly the right position, irrespective of where the overlay 210 is on the larger touchscreen 430. In addition, the relative dimensions of the input interface 440 will be the same as that depicted in FIG. 2, which ensures that the method is compatible with the same overlay 210 even when the method is executed by different devices. Moreover, it is easy for a user to locate the other key positions from the '5' key reference 440a. That is, the '5' key 440a provides a natural and intuitive reference point for the input interface 440 to aid a user of the touchscreen 430 who may be visually impaired.

The above discussions relate to the use of one, two or three alignment marks on the overlay 210 in aligning the overlay 210. The number of marks is limited to three for simplicity and to aid understanding. As a consequence, none of the previously described alignment marks constitute input marks. However, any number of further marks (e.g. tactile features) could be added to the overlay 210 in order to assist with the location of the keypad digits, whilst being transparent to normally sighted users. Any such marks that are not used for calibrating the input interface 440 would be considered input marks in the context of this disclosure. An example of an overlay having a plurality of input elements is a floor selection touchscreen for a lift (e.g. that shown in FIG. 7), which may have a plurality of tactile elements that allow a user to select an appropriate floor (i.e. at least one tactile feature per floor) but which is only calibrated using a small number of tactile features which serve as the alignment marks. Similarly, when a numerical keypad is used, there may be different numbers of tactile elements in different places on the overlay 210 (e.g. 1 dot corresponding to the '1' key, 2 dots corresponding to the '2' key, 3 dots corresponding to the '3' key, etc. etc.) and only a subset of these may be used in the alignment process and thereby constitute alignment marks.

Figure 5:
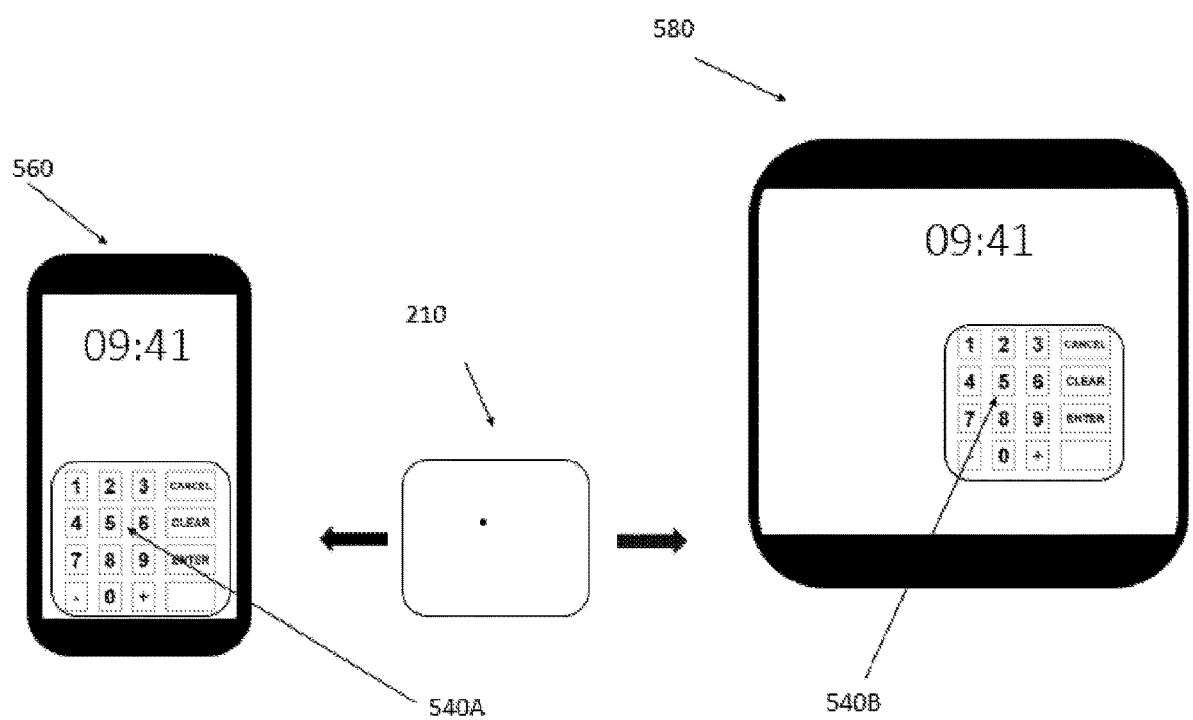
FIG. 5 shows an overlay and two devices suitable for use with the overlay.

FIG. 5 shows how the same overlay 210 can be used on either an iPhone 560 or an iPad 580, each of which may be loaded with software component 250, and how identical data entry keypads 540A and 540B having the same size would be displayed on both devices using the methods of this disclosure. Various devices having relatively small touchscreens may be used (e.g. smartphone, such as an iPhone or an Android phone). Similarly, various devices having relatively large touchscreens may be used (e.g. a touchscreen monitor, or a tablet, such as an iPad or an Android tablet). Various operating systems may be used such as, for example, Windows, Android, iOS and Linux. The overlay 210 may be the same size as the touchscreen 230 or smaller than the touchscreen 230 depending on the device used.

Using the methods of the disclosure, an overlay 210 can be fitted reliably to either device 560, 580 in a way that ensures that the overlay 210 is in good alignment with the rendered input interface 440 regardless of the specific dimensions of the device used. The software component 250 may use knowledge of the device on which it is installed to assist in rendering an input interface 440. For instance, the methods of this disclosure may use the physical dimensions of the touchscreen and/or the resolution of the touchscreen in determining the region in which to render the input interface 440. Such a process may involve scaling the number of pixels to use for the region in which the interface is to be rendered, with this scaling being based on the screen size and resolution.

FIGS. 6A and 6B show examples 600A and 600B of input schemes that correspond to numerical keypads. These may be rendered depending on whether the X dimension of the overlay 210 is horizontal, or whether it is vertical. Scheme 600A has the function keys to the right of a numeric keypad whilst scheme 600B has function keys below a numeric keypad. That is to say, the input elements of the input interface are arranged differently in the first and second schemes. The selection of a different scheme depending on the orientation of the overlay 210 with respect to the touchscreen may improve ergonomics and usability.

The input schemes in FIGS. 6A and 6B have different aspect ratios. In other words, the input interfaces 600A and 600B have different dimensions in the x and y directions. In FIGS. 6A, the input interface 600A has a greater width (the dimension in the x direction) than height (the dimension in the y direction). In FIG. 6B, the input interface 600B has a greater height than width. The methods of this disclosure can automatically present the correct interface based on the received inputs. For instance, if the three touch input points are the two corners and the 5 key, then the positions of the touch inputs can be used to determine which input scheme should be used for rendering.

Figure 7:
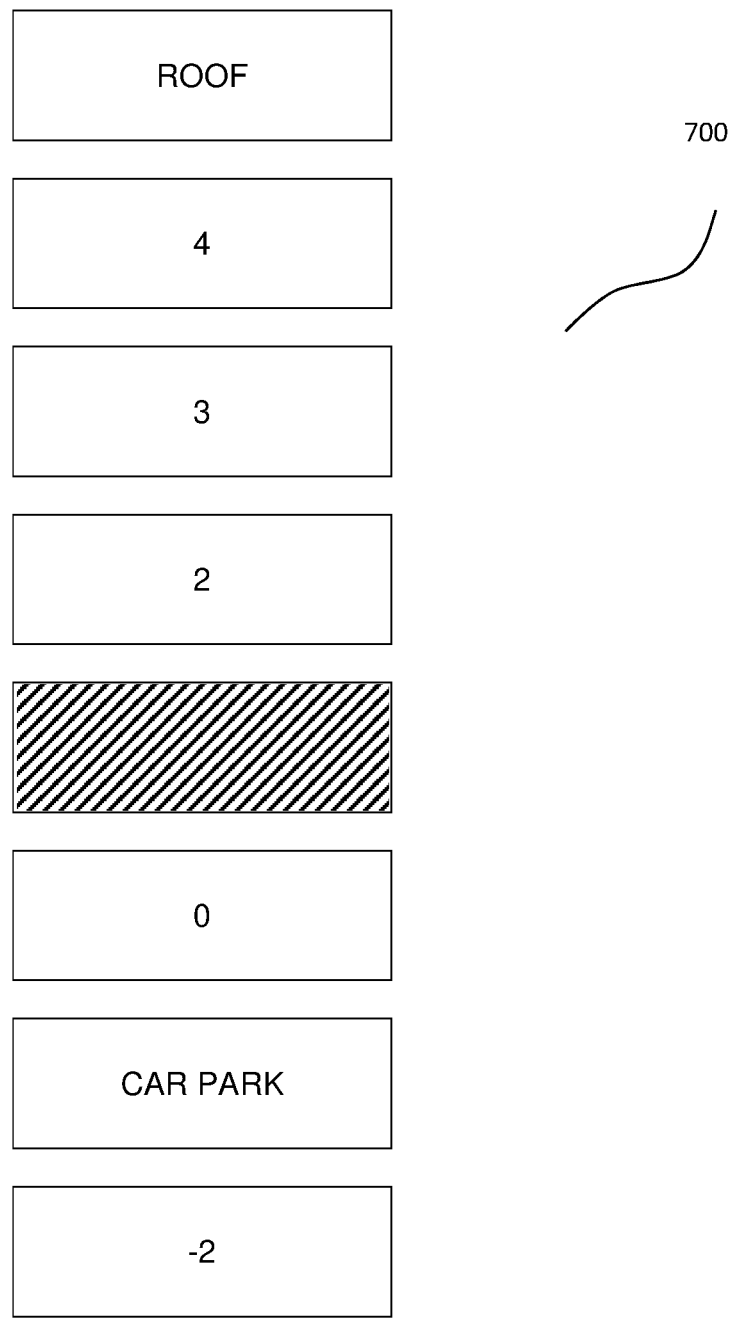
FIG. 7 shows an example of an overlay having a plurality of input elements, which is a touch screen for calling a lift (elevator).

In FIG. 7, a scheme for an input interface 700 for calling a lift (elevator) is depicted. Such an interface may be displayed (e.g. on a wall-mounted tablet) when a user is on the first floor of a building, which is apparent because the button for selecting the first floor is not available for selection (because the user is already there and so there is no need to call a lift to the first floor). A number of other floors of the building are available for selection, including the roof, floors 2 to 4, ground floor (floor '0'), the car park (floor '−1') and the basement (floor '−2').

It may be difficult for a visually impaired user to interact with such an interface as it may not be standardised, since various buildings have different numbers of floors and hence the lifts in different buildings will have different floor selection interfaces. However, the provision of a transparent overlay, similar to the previously described overlay 210, may aid such users. In particular, such an overlay may be affixed to a touchscreen showing the interface 700, and then calibrated accurately using the methods described previously. In this case, the overlay may be provided with braille text (or other tactile features) to assist a user of the lift in knowing which floor they are selected. The input interface may be disabled (e.g. using a voice command or using a switch on the touchscreen) whilst a user touches the screen to determine which floor they wish to select (to avoid inadvertently calling a lift to an incorrect floor), and the user may then reactivate the input interface and select an appropriate floor of the building with the help of the overlay's tactile elements. The methods of the disclosure can be used to ensure that each tactile element on the overlay (i.e. all input and alignment marks) is aligned with an appropriate input element (e.g. 'ROOF') on the input interface, by rendering the input interface based on an alignment process which uses an alignment mark. Thus, it will be appreciated that the disclosure is useful for visually impaired users of various touchscreen devices in a variety of contexts.

It will be appreciated that many variations may be made to the above methods and apparatus whilst retaining these advantages. For example, whilst the above embodiments have been described primarily with reference to payment interfaces, many lifts are operated using touchscreen tablets with buttons thereon used for calling a lift. The same methods and systems as described above could also be applied in a lift to select the floor required. These principles may be used in various other scenarios in which touchscreen devices are used. It will also be understood that although the disclosure has been described with reference to particular types of data, devices and applications, and whilst the disclosure provides particular advantages in such cases, as discussed herein the disclosure may be applied to other types of data, devices and applications.

For example, throughout the above discussion, the overlay 210 is typically transparent, since it will then not interfere with normally sighted users, and importantly in the payment environment, precludes any possibility of the insertion of PIN disclosing bugs (since that would be clearly visible to any normally sighted user or the merchant). However, portions of the overlay may not be completely transparent.

Each feature disclosed in this specification, unless stated otherwise, may be replaced by alternative features serving the same, equivalent or similar purpose. Thus, unless stated otherwise, each feature disclosed is one example only of a generic series of equivalent or similar features.

As used herein, including in the claims, unless the context indicates otherwise, singular forms of the terms herein are to be construed as including the plural form and, where the context allows, vice versa. For instance, unless the context indicates otherwise, a singular reference herein including in the claims, such as "a" or "an" (such as a touch input or an overlay) means "one or more" (for instance, one or more touch inputs, or one or more overlays). Throughout the description and claims of this disclosure, the words "comprise", "including", "having" and "contain" and variations of the words, for example "comprising" and "comprises" or similar, mean "including but not limited to", and are not intended to (and do not) exclude other components.

The use of any and all examples, or exemplary language ("for instance", "such as", "for example" and like language) provided herein, is intended merely to better illustrate the disclosure and does not indicate a limitation on the scope of the disclosure unless otherwise claimed. No language in the specification should be construed as indicating any non-claimed element as essential to the practice of the disclosure.

Any steps described in this specification may be performed in any order or simultaneously unless stated or the context requires otherwise.

All of the aspects and/or features disclosed in this specification may be combined in any combination, except combinations where at least some of such features and/or steps are mutually exclusive. In particular, the preferred features of the disclosure are applicable to all aspects and embodiments of the disclosure and may be used in any combination. Likewise, features described in non-essential combinations may be used separately (not in combination).

The invention claimed is:

1. A method for aligning an input interface of a touchscreen with an overlay for the touchscreen, the method comprising:
   receiving a touch input on the touchscreen, wherein the touch input identifies a first position on the touchscreen corresponding to an alignment mark of the overlay;
   receiving a second touch input on the touchscreen that identifies a second position on the touchscreen corresponding to a second alignment mark of the overlay;
   determining, based on the received touch inputs, a region of the touchscreen in which to render the input interface;
   rendering the input interface in the determined region of the touchscreen;
   rendering the input interface in a first scheme when a short edge of the input interface is oriented horizontally on the touchscreen; and
   rendering the input interface in a second scheme when a short edge of the input interface is oriented vertically on the touchscreen,
   wherein input elements of the input interface are arranged differently in the first and second schemes.

2. The method of claim 1, comprising rendering one of the input elements of the input interface at the first position, such that the rendered input element is aligned with the alignment mark of the overlay.

3. The method of claim 1, wherein rendering the input interface comprises rendering one or more of the input elements in alignment with one or more corresponding input marks of the overlay.

4. The method of claim 3, wherein rendering the input interface comprises rendering each of the input elements in alignment with a corresponding input mark of the overlay.

5. The method of claim 1, comprising receiving a third touch input on the touchscreen that identifies a third position on the touchscreen corresponding to a third alignment mark on the overlay.

6. The method of claim 5, wherein the second and third positions correspond to corners of the input interface.

7. The method of claim 1, comprising:
determining, based on the received touch inputs, a size for the input interface; and
rendering the input interface with the determined size.

8. The method of claim 1, comprising:
determining, based on the received touch inputs, an orientation for the input interface; and
rendering the input interface with the determined orientation.

9. The method of claim 8, wherein determining the orientation for the input interface is based on:
the positions of the received touch inputs; and/or
the order in which the touch inputs are received.

10. The method of claim 1, wherein the method comprises:
determining an aspect ratio for the input interface based on the received touch inputs;
rendering the input interface with the determined aspect ratio; and
wherein the input interface has edges having different lengths.

11. The method of claim 1, wherein the input interface comprises:
in the first scheme, one or more function keys arranged below a keypad and/or keyboard; and/or
in the second scheme, one or more function keys arranged to a side of a keypad and/or keyboard.

12. The method of claim 1, wherein the first and second positions correspond to corners of the input interface.

13. The method of claim 1, wherein the input interface comprises an arrangement of one or more input elements selected from:
a keypad;
a payment terminal interface;
a keyboard;
numeric characters;
alphanumeric characters;
symbolic characters;
one or more function keys;
a PIN entry device;
an automated teller machine PIN pad; and/or
a chip authentication program interface.

14. The method claim 1, further comprising:
receiving an input indicative of an audio request; and
in response to receiving the input indicative of an audio request, providing an audio prompt to a user of the touchscreen.

15. The method of claim 14, wherein the audio prompt comprises audio instructions for using the: touchscreen; input interface; and/or overlay.

16. The method of claim 14, wherein the input indicative of a request for audio output comprises one or more of:
a long press on the touchscreen;
a plurality of presses on the touchscreen within a predefined time period; and/or
an audio input.

17. A method comprising:
placing an overlay comprising one or more alignment marks on the touchscreen of a device having the touchscreen; and
causing the device to perform the method of claim 1.

18. A non-transitory computer-readable medium having stored thereon a computer program comprising instructions to cause a device having a touchscreen to execute the method of claim 1.

19. A device having the touchscreen and arranged to execute the computer program of claim 18.

20. The device of claim 19, wherein the device is:
a point-of-sale device;
a mobile phone;
a touchscreen monitor;
a tablet;
a gaming device;
an automated teller machine;
an electronic voting machine; or
a self-service kiosk.

21. A system comprising:
the non-transitory computer-readable medium of claim 18; and
an overlay for a touchscreen, the overlay comprising one or more alignment marks for aligning the overlay with an input interface when the computer program is executed.

22. The system of claim 21, wherein the overlay comprises one or more input marks each corresponding to an input element of the input interface.

23. The system of claim 22, wherein the input marks and/or the alignment marks are tactile elements.

24. The system of claim 23, wherein one or more of the tactile elements are: a protrusion; a depression; or an opening.

25. The system of claim 21, wherein the overlay is transparent.

26. The system of claim 21, wherein the overlay is: the same size as the touchscreen; or smaller than the touchscreen.

27. The system of claim 21, wherein the overlay is: square; rectangular; circular; triangular; or polygonal.

* * * * *